US009341701B2

(12) United States Patent
Sellier et al.

(10) Patent No.: US 9,341,701 B2
(45) Date of Patent: May 17, 2016

(54) METHOD FOR SYNCHRONIZING TIME MEASUREMENTS CARRIED OUT IN A RADIO COMMUNICATION NETWORK FOR GEOLOCATION PURPOSES

(71) Applicant: SIGFOX, Labege (FR)

(72) Inventors: Laurence Sellier, Toulouse (FR); Christophe Fourtet, Pompignan (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 14/375,307

(22) PCT Filed: Feb. 7, 2013

(86) PCT No.: PCT/EP2013/052475
§ 371 (c)(1),
(2) Date: Jul. 29, 2014

(87) PCT Pub. No.: WO2013/117670
PCT Pub. Date: Aug. 15, 2013

(65) Prior Publication Data
US 2014/0378161 A1 Dec. 25, 2014

(30) Foreign Application Priority Data
Feb. 7, 2012 (FR) ...................................... 12 51142

(51) Int. Cl.
*G01S 5/06* (2006.01)
*G01S 5/02* (2010.01)

(52) U.S. Cl.
CPC ........ *G01S 5/06* (2013.01); *G01S 5/0221* (2013.01)

(58) Field of Classification Search
USPC .......... 455/456.1, 456.5, 404.2, 456.2, 456.3; 370/252
See application file for complete search history.

(56) References Cited

U.S. PATENT DOCUMENTS

| | | | | |
|---|---|---|---|---|
| 5,148,179 A * | 9/1992 | Allison | ................... | G01S 19/44 342/357.31 |
| 6,115,599 A * | 9/2000 | Stilp | ........................ | G01S 5/02 455/102 |
| 2002/0080069 A1 * | 6/2002 | Stilp | ........................ | G01S 5/02 342/387 |
| 2004/0002347 A1 * | 1/2004 | Hoctor | ................. | H04B 1/7163 455/456.1 |
| 2004/0178955 A1 * | 9/2004 | Menache | ................ | A61F 13/06 342/463 |
| 2011/0207470 A1 * | 8/2011 | Meredith | .............. | G01S 5/0252 455/456.1 |
| 2012/0020320 A1 * | 1/2012 | Issakov | ................. | G01S 5/0221 370/330 |
| 2013/0044610 A1 * | 2/2013 | Zhao | .................... | H04B 7/0417 370/252 |

FOREIGN PATENT DOCUMENTS

EP 1703296 A2 9/2006

OTHER PUBLICATIONS

3GPP TS 36.213 V10.0.0 (Dec. 2012) Physical layer procedures (Release 10).*
International Search Report dated Mar. 13, 2013, for corresponding International Application No. PCT/EP2013/052475, 7 pages.

* cited by examiner

*Primary Examiner* — Nathan Taylor
(74) *Attorney, Agent, or Firm* — Seed IP Law Group PLLC

(57) ABSTRACT

The invention relates to a system for forming an asynchronous communication network for receiving client transmitters, comprising base stations that are remote from one another, said network enabling the geolocation of the client transmitters. For this purpose, the system comprises a plurality of stationary reference transmitters, the positions of which are known and each of which transmits a specific beacon signal in a frequency band included within the frequency band of the network. The geolocation of a client transmitter is carried out by multilateration by taking pairs of base stations into consideration, each pair consisting of base stations capable of receiving the signals from the client transmitter and the signals from a single reference transmitter, and by calculating the difference between the times the signal from the client transmitter arrived at the base stations, said difference being determined by calculating, for each base station, the difference between the times of arrival of the signal transmitted by the client transmitter and of that transmitted by the reference transmitter.

10 Claims, No Drawings

METHOD FOR SYNCHRONIZING TIME MEASUREMENTS CARRIED OUT IN A RADIO COMMUNICATION NETWORK FOR GEOLOCATION PURPOSES

The invention relates to the general field of radio communication networks. It more specifically relates to asynchronous unidirectional radio communication networks, serving terminals, of FSFDMA type, desiring to provide a service of geolocation by multilateration.

In the context of an asynchronous radio communication network, geolocation by multilateration is performed either by measuring the time difference on arrival (TDOA) of signals transmitted by a plurality of transmitters located at known given positions and received by a receiver, as is the case for the LORAN or "LOng RAnge Navigation" radio navigation system, or by measuring the time difference on arrival of the signal originating from a same transmitter and received by different receivers located at different points, as is for example the case for passive detection.

Such a time difference of arrival (TDOA), which results from the difference in propagation time of the signal transmitted by a same transmitter towards the locations of the different receivers, enables, in known fashion, to determine the geographical locus of the transmitter. However, such a determination requires, in known fashion, that the different network access points (receiver base stations) be equipped to maintain time bases synchronized with one another, to be able to compare their measurements and to deduce the TDOA with a minimum uncertainty. It should here be reminded that the accuracy of the calculated position mainly depends on the dating accuracy of the received signals, on the fineness of the synchronization between receivers and on the geometry of the geographical deployment of the network elements implied in the position calculation.

In the case of a network serving its terminals, of FSFDMA type, in other words, a frequency division multiple access network, where the frequency is of statistical nature, the transmitters to be located are the client transmitters of the network. The time difference on arrival information (TDOA) allowing the geolocation of these transmitters is calculated from the signals received by the base stations of the network.

Now, such receiver base stations are remote from one another, with a low synchronization therebetween (synchronization in the order of one ms), and do not have synchronous communication means. Accordingly, the creation of a hardware synchronization of the base stations of the network requires significant hardware modifications of the network, which significantly increase the general cost of said network.

Generally, the network synchronization issue is widely addressed in specialized technical literature, as concerns the synchronization of hardware clocks (NTP-type synchronization or with opportunistic signals) by means of physical synchronization means as well as concerns the synchronization of virtual time bases by software means (RBS-type synchronization, for example). Now, in the specific case of geolocation, a synchronization accuracy much smaller than one microsecond is necessary, a temporal accuracy of one microsecond ideally corresponding, in known fashion, to a 330-m distance accuracy.

Accordingly, the synchronization technique of networks of NTP ("Network Time Protocol") type is not sufficient to achieve this object. Indeed, the obtained accuracy performance is, off-load, in the order of a few tens of microseconds for the elements of stratum 3 of the network, which are the most common elements, and are heavily impacted by the increase of the round trip time of signals in load conditions. The synchronization accuracy may then drop down to a value in the order of one millisecond.

The use of a synchronization similar to that of NTP-type networks would thus require adding local time references, which would amount to actually transforming the receiver bases of the network into stratum-1 elements, that is, into elements capable of directly accessing a general reference clock; as well as the implementation of deterministic hardware event dating processes on peripheral clocks.

Further, known techniques of reference broadcast synchronization, or RBS, or wireless network synchronization, which enable to do away with inaccuracies inherent to NTP-type synchronizations, due to data sending and network access delays, are however tainted with a residual inaccuracy due to the propagations times of messages between receivers (deterministic error) and to the reception processing time (non-deterministic error). They further have the disadvantage of generating a significant network traffic to achieve the desired synchronization.

The synchronization by analysis of opportunistic signals enables to synchronize base stations receiving pre-existing highly-accurate reference signals, for example, in AM or FM bands. However, such a technique requires implementing hardware modifications on the bases to make then capable of sensing these signals, which have frequencies that are not necessarily located in the frequency band exploited by the considered network. This is a major disadvantage, since the use of opportunistic signals does not enable to perform the calculation simplifications which enable to do away with the hardware synchronization of clocks.

An aim of the invention is to provide a solution enabling to synchronize the signals received by the different base stations of a communication network, from the unidirectional and non-synchronous client transmitters of the network, to obtain, by measurement of the times of arrival of these signals on each base, the differential time of arrival (DTOA) and accordingly the position of said transmitters, with a sufficient distance accuracy to geolocate them. Another object of the invention is to provide a solution which does not require implementing specific means to closely synchronize the base stations of the network with one another.

For this purpose, the invention aims at a radio communication system for forming a communication network intended to receive client transmitters. Said system comprises a plurality of stationary receiver base stations, remote from one another, arranged to cover the area having the communication network extending thereon, and connected to a network management and supervision entity. Said receiver bases comprise means for estimating the time of arrival of the signals that they receive. The system according to the invention further receives a plurality of stationary reference transmitters, having known positions, each transmitting a specific beacon signal. The number and the arrangement of said reference transmitters are defined so that the entire area having the communication network extending thereon is covered by the beacon signal transmitted by at least one reference transmitter. Said system further comprises means for determining, for each receiver base m, the respective times of arrival TOA($A_n$) and TOA($G_n$) of the signal transmitted by a client transmitter α and of that transmitted by a reference transmitter G, as well as difference TOA($A_n$, $G_n$) between these two times and for determining, for two receiver bases i and j, difference $\Delta TOA_{i,j}$ between the time of arrival of the signal transmitted by the considered client transmitter on first receiver base i and the time of arrival of this same signal on second receiver base j. This difference is determined from differences $TOA_i(A_n, G_n)$ and $TOA_j(A_n, G_n)$ determined for a same reference transmitter G. Differences $\Delta TOA_{i,j}$ determined for different pairs of receiver bases being used to determine by multilateration the position of the client transmitter in the area covered by the network.

According to an embodiment, the signals transmitted by the client transmitters and the reference transmitters are signals modulated by data sequences having a structure defined to enable to estimate the time of arrival of the considered signal on a receiver base station with a given accuracy, and this, via an appropriate estimator, for example, using a correlation operation.

According to a first variation of this embodiment, the transmissions of the different reference transmitters are performed successively in accordance with a given time multiplexing scheme.

According to another variation of this embodiment, the transmissions of the different reference transmitters are performed simultaneously at different frequencies in accordance with a given frequency multiplexing scheme.

According to another embodiment, for each receiver base i, the determination of difference $TOA_j(A_n, G_n)$ is performed at the base by its own processing means.

According to another embodiment, for each pair of receiver bases (i, j), difference $\Delta TOA_{i,j}(A_n)$ is determined by a calculation instance allocated by the network supervision entity, each receiver base transmitting to the network supervisor all or part of the received data frames, in temporal form or in the form of a spectrum, after having associated an order number therewith.

According to another embodiment, each receiver base i further comprises means for determining the variation of its received signal sampling frequency $F_{si}$, such a variation being determined from difference $\Delta TOA_i(G_p, G_q)$ between the times of arrival of two successive frames p and q of the beacon signal of a same reference transmitter. In this embodiment, the entire frequency plane to which $F_{si}$ is attached in the receiver base can be disciplined by the reference transmitter, that is, frequency-controlled by it.

According to another embodiment, the determination of the variation of frequency $F_{si}$ of sampling of the received signals of each receiver base i is performed at the level of the sub-system which controls the network formed by all the receiver bases, such a variation being determined from difference $\Delta TOA_j(G_p, G_q)$ of the times of arrival of two successive frames p and q of the beacon signal of a same reference transmitter. In this embodiment, the entire frequency plane to which $F_{si}$ is attached in the receiver base can be disciplined by the reference transmitter.

According to another embodiment, each base station comprises means for estimating the angle of arrival (AOA) of the signal, which technique is known as radiogoniometry, and which combines with the TOA measurement to refine the geolocation accuracy.

Advantageously, the provided method enables to accurately date, ex post hoc, the signals received from the client terminals which are desired to be located, without requiring a specific hardware synchronization or software synchronization of the network clocks. The regularity of the beacon frames enables to correct residual relative errors due to clock drifts between base stations.

It advantageously enables to perform by calculation, at the network level, a data retiming, that is, a pseudo-synchronization, which enables to compare the times of arrival of the signals, measured by the different base stations, by minimizing the time/frequency uncertainties affecting the measurements. The TOA measurements are performed in the time base of each station, having its origin defined by the receiving of a beacon frame and the rating by the sampling frequency of the base station. To be able to restore ex post hoc the continuity of the sample flow and to recover the TOA information, the order number associated with a data frame to be processed may for example be defined as being the identifiers of one or a plurality of sampling blocks, which identifiers are assigned at the time of the storage of the sampled flow, the size of the sample block being defined with respect to the accuracy of the selected rough dating process.

It further enables to do away with the inaccuracy relative to the times of execution of non-deterministic processes which may be implemented in the network and in the base stations, which processes have a non-deterministic character capable of generating time measurement uncertainties.

The implementation of the method according to the invention advantageously has no hardware impact on the existing network elements, such as the network supervisor, the base stations, or the client radio transmitters, which are not modified in the hardware architecture. Only new independent hardware elements, that is, geodetic transmitters, are introduced.

The location method according to the invention is first based on the creation of a meshing of the considered space by means of one or a plurality of stationary transmitters, called geodetic transmitters, the position of each geodetic transmitter being known with an accuracy in relation with the desired location accuracy. Thus, for example, if a geolocation is desired to be performed with an accuracy in the order of some ten meters, the positions of the geodetic transmitters should be known with an accuracy below one meter.

The geodetic transmitters are deployed on the area covered by the network in geographical loci so that each geodetic transmitter covers a sufficiently extended area, to serve N base stations, N being by principle greater than or equal to 2. The number of deployed geodetic transmitters is defined so that each pair of base stations is covered by at least one geodetic transmitter. The coordinates of each geodetic transmitter are noted on installation and known by the network supervisor, which is in charge of supervising the entire network.

In the simplest deployment form, each of the geodetic transmitters is further positioned in the line of sight of the stations of its geographical sector. Thus, the considered receiver stations are capable of receiving the transmitted signals in direct reception. It is however possible to position the geodetic transmitters outside of the line of sight of the stations, in which case an adjustment of the measurement of the path really traveled by the signal should be provided, which adjustment may for example be taken charge of by the network supervisor.

Each geodetic transmitter is configured to form a reference transmitter of the network where it operates, an FSFDMA network, for example. For this purpose, it has a hardware and software architecture similar to that of the client transmitters, which enables it to communicate with the receiver bases over existing physical channels. It however has several specificities.

A first specificity relates to the synthesis of the transmitted frequency. Geodetic transmitters are configured to have a strictly controlled frequency behavior. Each geodetic transmitter comprises for this purpose an accurate frequency reference (tolerance in the order of 0.1 ppm on the frequency), a frequency reference of OCXO or GPS-DO type, for example, and a low-noise and low-dispersion frequency synthesis chain, of Frac-N type, for example.

A second specificity relates to the transmitted signal. Geodetic transmitters transmit a signal modulated by a binary sequence defined to obtain the desired measurement accuracy, the used modulation rule affecting, in known fashion, the accuracy of the TOA measurement.

For this purpose, each geodetic transmitter is for example associated with a binary sequence of length N which modulates the transmitted signal. The sequence for example forms a code of M-seq, Kasami, or Gold type. The self-correlation properties provided to the signal by this type of sequence advantageously enable the base stations to perfectly distinguish geodetic transmitters from one another and to accurately measure the times of arrival of the signals transmitted by the latter.

Each geodetic is thus identified on reception by the single binary sequence that it transmits. The code is used to generate a beacon frame according to the network protocol, at the FSFDMA format, for example. The frame is then diffused over the network towards the base stations which receive the signals.

A third specificity relates to the duration of the transmitted frames. The communication network considered herein being a radio communication network, the duration of the frame transmitted by the geodetic transmitter is sufficiently long for the local degradations undergone by the signal and the errors generated by the frame processing means to be minimized by averaging effect, whatever the reception fluctuations. The increase of the signal observation window indeed advantageously enables to eliminate non-correlated errors. Further, the delays between beacon frames are controlled and known by the network supervisor.

Geodetic transmitters thus transmit signals of stable frequency, in the form of frames generally deprived of quantitative data, the reception of which enables the considered receiver base (that is, the base station) to determine the identity of the transmitter and to regenerate, with the desired accuracy, information relative to the time of arrival, or TOA, of the transmitted signal.

Although, in principle, geodetic transmitters transmit an identifier only rather than operational information, the modulation rule is here identical to that used by the client transmitters of the network to transmit operational data frames.

The location method according to the invention is based, secondly, on the introduction of a specific location processing, which locates a client transmitter based on the signals transmitted by said client transmitter and on those transmitted by a given geodetic transmitter, such signals being received by two different receiver bases.

It is conventional, in a network, to locate a client transmitter by considering the times of arrival of the signals received by two different receiver stations from this transmitter and corresponding to a same transmission time. The time difference of arrival (TDOA) is more exactly considered.

However, unlike what is generally done, the TDOA is calculated herein by involving, for each receiver base, the measurement of the time difference of arrival between the frames transmitted by a given geodetic transmitter and those transmitted by the considered client transmitter, the selected geodetic transmitter here being the same transmitter for the two receiver bases.

Accordingly, according to the invention, the time difference of arrival $TDOA_{i,j}(A_n)$ of a frame $A_n$ transmitted by a client transmitter and received by two receiver bases $B_i$ and $B_j$ is determined from the following relation:

$$TDOA_{i,j}(A_n) = TOA_j(A_n) - TOA_i(A_n) \quad [1]$$
$$= TOA_j(A_n, G_n) - TOA_i(A_n, G_n) + TDOA_{i,j}(G_n)$$

where $TOA_j(A_n)$ and $TOA_i(A_n)$ respectively stand for the measurements of the times of arrival of frame $A_n$ transmitted by the considered client transmitter on receiver bases $B_i$ and $B_j$ and where $TOA_j(A_n, G_n)$ and $TOA_i(A_n, G_n)$ respectively stand, for each receiver base, for the difference between the time of arrival of the signal transmitted by the client transmitter and the signal transmitted by the geodetic transmitter.

$TDOA_{i,j}(G_n) = TOA_j(G_n) - TOA_i(G_n)$ here stands for the time difference of arrival on the two receiver bases of the frame of rank n transmitted by the considered geodetic transmitter G. Since the position of this transmitter is perfectly well known, as well as the positions of receiver bases $B_i$ and $B_j$, $TDOA_{i,j}(G_n)$ is also known. It is defined by the following relation:

$$TDOA_{i,j}(G_n) = TOA_j(G_n) - TOA_i(G_n) \quad [2]$$
$$= \frac{d_{GBj} - d_{GBi}}{c}$$
$$= \frac{\|\overrightarrow{GB_j}\| - \|\overrightarrow{GB_i}\|}{c}$$

Information $TDOA_{i,j}$ thus calculated is conventionally used to determine the geographical position of the considered client transmitter. Designating with $\alpha$ the considered client transmitted, one can indeed write:

$$d(\alpha, \beta_j) - d(\alpha, B_i) = c \cdot TDOA_{i,j} \quad [3]$$
$$= c \cdot (TOA_j(A_n, G_n) - TOA_i(A_n, G_n)) +$$
$$d_{GBj} - d_{GBi}$$

which, in a 3-dimensional reference frame, can be written as follows:

$$\sqrt{(x - x_j)^2 + (y - y_j)^2 + (z - z_j)^2} - \quad (4)$$
$$\sqrt{(x - x_i)^2 + (y - y_i)^2 + (z - z_i)^2} = c \cdot (TOA_j - TOA_i) + d_{GBj} - d_{GBi}$$

where x, y, and z stand for the coordinates of client transmitter $\alpha$ in this reference frame.

The points in space having coordinates which are the solution of equation [4] are located in known fashion on a 2-sheet rotational hyperboloid. Accordingly, the real position of the transmitter may be determined by any known method by using the obtained TDOA measurements by considering a plurality of different pairs of receiver stations and by solving the hyperbolic equation systems connecting these different measurements.

Such a relative measurement of the time difference of arrival of the signal transmitted by a client transmitter on two considered receiver bases, which measurement involves the times of arrival of the signals transmitted by a geodetic transmitter having its transmissions accessible by the two receiver bases, thus advantageously enables, by the use of relative measurements, to do away with any need to perform a strict synchronization of the clocks of the receiver stations.

According to the invention, the times of arrival of the signals transmitted by the geodetic transmitter and the client transmitter are determined by any known method, the accuracy of estimation of the times of arrival intrinsically being a function of the waveform processed by the network and, by a lesser extent, on the receive sampling frequency.

Thus, in the case where the signals are transmitted in the form of binary frames modulating the transmit frequency, as is the case in a FSFDMA-type network, the data frames are received and decoded by the receiver stations. Each receiver station which receives a data frame from a geodetic transmitter or from a client transmitter of the network performs a dating thereof in its own general time reference frame. The actual estimate of the time of arrival of the frame is performed ex post hoc by means of a correlation estimator which performs a correlation operation on all or part of the considered frame.

The times of arrival estimated on the two considered receiver bases $B_i$ and $B_j$ may be defined by the following relations.

$$TOA_i(A_n) = T_{0i} + \frac{E_i(A_n)}{F_{si}} \quad [5]$$

and $$TOA_j(A_n) = T_{0j} + \frac{E_j(A_n)}{F_{sj}} \quad [6]$$

where $E_i(A_n)/F_{si}$ and $E_j(A_n)/F_{sj}$ respectively stand, for each of bases $B_i$ and $B_j$, for the result of the (ex post hoc) estimate of the time of arrival of the signal with respect to the date assigned to frame $A_n$, which result is expressed in a fractional number of sampling periods.

$E_i(A_n)$ and $E_j(A_n)$ stand for the values of the operator for estimating the correlation for frame $A_n$, $F_{si}$ and $F_{sj}$ stand for the respective sampling frequencies of the two receiver bases, and $T_{0i}$ and $T_{0j}$ stand for the respective reference times of the two bases, which times correspond to the dates of arrival of frame $A_n$ that each receiver station takes as an origin of its local time base, and that it communicates to the network supervisor (ideally $T_{0i}$ and $T_{0j}$ are equal if the bases are perfectly synchronized).

In the same way:

$$TOA_i(G_n) = T_{0i} + \frac{E_i(G_n)}{F_{si}}; \quad [7]$$

and $$TOA_i(G_m) = T_{0i} + \frac{E_i(G_m)}{F_{si}} \quad [8]$$

It should be noted that in order to raise the uncertainties linked to the lack of determinism of receive software processes, the virtual time base of the base stations is defined at closest to the hardware, on sampling of the radio signal.

From a functional point of view, the method according to the invention may be implemented in different ways from an existing infrastructure, the main condition of implementation being the implantation of geodetic transmitters and the introduction of means for determining ex post hoc the values of the time differences of arrival (TDOA) such as described previously and to process them to determine the position of the considered client transmitter.

Thus, according to the considered embodiment and to the calculation capacity available at each receiver base, the locating function may be implemented more or less completely in the calculation means of each receiver base or widely transferred to the network controller.

Each base can thus, if its specific calculation means enable it, be configured to take charge of all the calculations of the time difference of arrival values (TDOA) and transmit these values to the network controller so that it performs the actual location, by combining the measurements transmitted by different receiver stations. As a variation, each receiver station may transmit to the network supervisor all or part of the signals received and sampled in temporal or spectral form. In a minimal configuration, each station may be content with transmitting to the supervisor the received frames after having roughly dated them, where such a rough dating may be a order of arrival number associated with each received frame. The network controller then takes in charge all the calculations necessary to perform the geolocation of the considered client transmitter. Advantage can thus be taken of having the data flows of a plurality of bases available on the same calculation entity to simplify the calculations of estimation of the times of arrival.

At this stage, and in the case where a plurality of geodetic transmitters are received for a same set or subset of stations, the network controller selects, per pair of stations, the configuration providing the best probability of estimation accuracy, by analyzing the available parameters, say the quality of the received signals and the provision of geometric dilution of precision. In the case of equivalent configurations, it may be chosen to perform concurrent calculations to more rapidly converge in the position estimate.

It should be noted that for the geolocation function that it is in charge of, the method according to the invention may be associated with complementary radiogoniometry measurements, each being for this purpose equipped with means for estimating the angle of arrival (AOA) of the signal. Such a complementary technique enables to refine the position accuracy and to raise the uncertainties known in multilateration limiting cases.

It should also be noted that, in addition to the geolocation function that it is in charge of, the method according to the invention may further enable to perform other secondary functions.

Thus, for example, it is possible, based on the available information, to perform an accurate estimate of sampling frequency $F_{si}$ of a receiver station $B_i$, the real sampling frequency $F_{si}$ being then estimated by means of two geodetic frames $G_n$ and $G_m$ originating from a same geodetic transmitter G and received by station $B_i$ ($G_n$ being used as the origin of time on $B_i$). Then, as previously:

$$TOA_i(G_n) = T_{0i} + \frac{E_i(G_n)}{F_{si}};$$

and $$TOA_i(G_m) = T_{0i} + \frac{E_i(G_m)}{F_{si}}.$$

Accordingly, one also has, for the considered receiver station $B_i$:

$$\Delta TOA_i(G_n G_m) = \frac{\Delta E_i(G_n G_m)}{F_{si}}; \quad [9]$$

where $\Delta TOA_i(G_n G_m)$ stands, in known fashion, for the interval between the transmissions of frames n and m by geodetic transmitter G and where $\Delta E_i(G_n G_m)$ stands, also in known fashion, for the difference between the times of arrival of these two frames, measured by the receiver station. $F_{si}$ can thus be easily calculated by the receiver station or the network controller. As a result, the frequency plane to which $F_{si}$ belongs for the considered base station can be disciplined, controlled, by the considered geodetic transmitter. As a result, also, when $F_{si}$ is in the same frequency plane as the different frequency references of the base station, it is also possible perform a correlation of all these frequencies from the correction of $F_{si}$.

Further, by using another formulation, it is also possible, by means of the same measurements, to assess the frequency drift of sampling frequency $F_{si}$ of base station $B_i$. Indeed, in such stationary radio conditions, by principle, $TOA_i(G_n)=TOA_i(G_m)$.

Accordingly, if values $MLE_i(m)$ and $MLE_i(n)$ measured for frames m and n are different, it can be deduced that there has been a drift $\delta f_i$ of the local clock and that this drift is equal to:

$$\delta f_i = \left(\frac{Ei(Gm)}{Ei(Gn)} - 1\right) \cdot F_{si} \quad [10]$$

It should also be noted that the fact of performing a differential dating on the base station, from a geodetic having its transmit frequency in the frequency band used by the network, eliminates at the same time, advantageously, part of the inaccuracies relative to propagation times in the material. Very generally, on can indeed write:

$$T_{arrival} = T_{transmit} + T_{propag}(TX) + T_{vol} + T_{propag}(RX) \quad (11)$$

where $T_{transmit}$ and $T_{arrival}$ respectively stand for the signal transmission cue time and the time of effective reception of this signal by the base station.

$T_{propag}(TX)$ and $T_{propag}(RX)$ stand for the signal propagation times within the materials respectively forming the considered transmitter and the receiver of the considered base station, and $T_{vol}$ stands for the signal propagation time in the space between the considered transmitter and the considered base station.

As a result, for block $G_n$ of the geodetic transmitter and block $A_n$ of transmitter $\alpha$, considering two base stations $B_i$ and $B_j$, one can write:

$$TDOA_{ij} = T_{transmit} + T_{propag}(TX) + T_{vol} + T_{propag}(Rx_j) - [T_{transmit} + T_{propag}(TX) + T_{vol} + T_{propag}(Rx_i)], \quad (12)$$

In other words, considering that $d(\alpha, B_j)$, $d(\alpha, B_i)$, $d(G, B_j)$, and $d(G, B_i)$ respectively stand for the distances from emitter $\alpha$ and geodetic transmitter G to base stations $B_i$ and $B_j$, one can write:

$$TDOA_{ij}(A_n) = [d(\alpha, B_j) - d(\alpha, B_i)]/c + DT_{propag}(RX_i, RX_j) \quad (13)$$

and $$TDOA_{ij}(G_n) = [d(G, B_j) - d(G, B_i)]/c + DT_{propag}(RX_i, RX_j) \quad (14)$$

where $DT_{propag}(RX_i, RX_j)$ stands for the difference between the propagation time of the received signal in the hardware ensuring the signal reception in station $B_j$ and the propagation time of the received signal in the hardware ensuring the signal reception in station $B_i$.

Accordingly, by subtracting these two relations to each other, the propagation times in the hardware of the base stations cancel, and there remains:

$$[d(\alpha, B_j) - d(\alpha, B_i)]/c = TDOA_{ij}(A_n) - TDOA_{ij}(G_n) + [d(G, B_i) - d(G, B_j)]/c,$$

where the following relation [3] can be recognized:

$$d(\alpha, B_j) - d(\alpha, B_i) = c[TDOA_{ij}(A_n, G_n)] + d(G, B_j) - d(G, B_i)$$

It is possible not to take into account these propagation times in the determination of $TDOA_{ij}$. This is why these terms are not mentioned in the previously-listed relations and it is particularly possible to write equality [3], where the propagation times of the received signals in the material at the level of the base stations are not involved.

The invention claimed is:

1. A radio communication system for forming a communication network serving client transmitters, capable of determining a position of a client transmitter moving in an area covered by the network, the system comprising a plurality of stationary base receiver stations, distant from one another, arranged to cover the area having the communication network extending thereon;

characterized in that it further comprises a plurality of stationary reference transmitters, having known positions, each transmitting a specific beacon signal, a number and arrangement of said reference transmitters being defined so that the entire area having the communication network extending thereon is covered by the beacon signal transmitted by at least one reference transmitter; wherein, in operation, the system determines respective times of arrival $TOA(A_n)$ and $TOA(G_n)$ at multiple base stations of frames of rank n carried by the signal transmitted by a client transmitter $\alpha$ and by that transmitted by a reference transmitter G, as well as difference TOA $(A_n, G_n)$ between these two times, so that the position of a client transmitter $\alpha$ is determined by multilateration, based on measurements of time differences of arrival $TDOA_{i,j}$ determined for different pairs of receiver bases $B_i$ and $B_j$, $TDOA_{i,j}$ corresponding to a difference between the time of arrival of a frame of rank n transmitted by the considered client transmitter $\alpha$ on first receiver base $B_i$ and the time of arrival of this same frame n on second receiver base $B_j$, this difference being calculated from times of arrival $TOA_i(A_n, G_n)$ and $TOA_j (A_n, G_n)$ determined for bases i and j and for a same reference transmitter G, by considering the following relation:

$$TDOA_{i,j}(A_n) = TOA_j(A_n, G_n) - TOA_i(A_n, G_n) + (d_{GBj} - d_{GBi})/c$$

where $d_{GBj}$ and $d_{GBi}$ stand for the distances between the reference transmitter G and respectively the bases $B_j$ and $B_i$, and c stands for the speed of light.

2. The system of claim 1, wherein a receiver base station comprises a correlation estimator and the signals transmitted by the client transmitters and the reference transmitters are signals modulated by data frames having a structure defined to enable to estimate the time of arrival of the considered signal by the correlation estimator of the receiver base station with a given accuracy based on a correlation operation performed on all or part of the considered frame.

3. The system of claim 1, characterized in that the transmissions of the different reference transmitters are performed successively in accordance with a given time multiplexing scheme.

4. The system of claim 1, characterized in that the transmissions of the different reference transmitters are performed simultaneously at different frequencies in accordance with a given frequency multiplexing scheme.

5. The radio communication system of claim 1, characterized in that for each receiver base $B_i$, difference $TOA_i(A_n, G_n)$ is determined at the base $B_i$.

6. The radio communication system of claim 1, comprising a network supervisor processing circuitry, characterized in that for each receiver base $B_i$, difference $\Delta TOA_i(A_n, G_n)$ is determined by the network supervisor processing circuitry, each receiver base transmitting to the network supervisor processing circuitry all or part of the received data frames, in temporal form or in the form of a spectrum, after having associated an order number therewith.

7. The system of claim 1, characterized in that each receiver base $B_i$, in operation, controls the frequency plane to which sampling frequency $F_{si}$ belongs, based on the determination of the frequency variation of $F_{si}$, such a variation being determined from difference $\Delta TOA_j(G_P, G_q)$ in the times of arrival of two successive frames p and q of the beacon signal of a same reference transmitter.

8. The system of claim 1, comprising a network control sub-system, characterized in that the variation of frequency $F_{si}$ of the sampling of the received signals of each receiver base $B_i$, and thus of the associated frequency plane, is determined at a level of the sub-system, which controls the network formed by all the receiver bases, such a variation being determined from difference $\Delta TOA_i(G_P, G_q)$ between the times of arrival of two successive frames p and q of the beacon signal of a same reference transmitter.

9. The system of claim 1, characterized in that each base station, in operation, estimates a signal angle of arrival (AOA), and refines the position accuracy based on the estimated AOA.

10. The system of claim 1 wherein the measured time of arrival of a frame of rank n carried by the signal transmitted by a client transmitter α and by that transmitted by a reference transmitter G and received by a respective base station have substantially a same clock drift.

* * * * *